United States Patent
Dayana et al.

(10) Patent No.: US 10,061,182 B2
(45) Date of Patent: Aug. 28, 2018

(54) SYSTEMS AND METHODS FOR AUTOFOCUS TRIGGER

(71) Applicant: QUALCOMM Incorporated, San Diego, CA (US)

(72) Inventors: Venkata Ravi Kiran Dayana, San Diego, CA (US); Karthikeyan Shanmugavadivelu, San Diego, CA (US); Shizhong Liu, San Diego, CA (US); Ying Chen Lou, Escondido, CA (US); Hung-Hsin Wu, San Diego, CA (US); Narayana Karthik Sadanandam Ravirala, San Diego, CA (US); Adarsh Abhay Golikeri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 15/618,409

(22) Filed: Jun. 9, 2017

(65) Prior Publication Data

US 2017/0277018 A1   Sep. 28, 2017

Related U.S. Application Data

(63) Continuation of application No. 14/791,035, filed on Jul. 2, 2015.

(51) Int. Cl.
*G03B 13/36* (2006.01)
*H04N 5/232* (2006.01)

(52) U.S. Cl.
CPC ......... *G03B 13/36* (2013.01); *H04N 5/23212* (2013.01)

(58) Field of Classification Search
CPC .............................. G03B 13/36; H04N 5/23212

USPC ................................ 396/125, 322, 325, 333
See application file for complete search history.

(56) References Cited

U.S. PATENT DOCUMENTS

| 5,400,110 A | 3/1995 | Soshi et al. |
| 5,864,360 A | 1/1999 | Okauchi et al. |
| 5,896,174 A | 4/1999 | Nakata |
| 6,341,012 B1 | 1/2002 | Yoshida |

(Continued)

FOREIGN PATENT DOCUMENTS

JP   2014188223 A   10/2014

OTHER PUBLICATIONS

International Search Report and Written Opinion—PCT/US2016/036891—ISA/EPO—dated Aug. 12, 2016.

*Primary Examiner* — Clayton E Laballe
*Assistant Examiner* — Linda B Smith
(74) *Attorney, Agent, or Firm* — Paradice and Li LLP

(57) ABSTRACT

Method and systems for autofocus triggering focusing are disclosed herein. In one example, a system may include a lens, a memory component configured to store lens parameters of the lens and regions of focus corresponding to the lens parameters, and a processor coupled to the memory and the lens. The processor may be configured to focus the lens on a target object at a first instance of time, receive information indicative of distances from an imaging device to the target object over a period of time, obtain lens parameters of the lens, and determine a region of focus, and trigger the lens to re-focus on the target object if the distance to the target object indicates the target object is outside of the region of focus and the distance to the target object is unchanged for a designated time period.

22 Claims, 6 Drawing Sheets

(56) References Cited

U.S. PATENT DOCUMENTS

| | | |
|---|---|---|
| 8,249,299 B1 | 8/2012 | Dhawan et al. |
| 8,483,437 B2 | 7/2013 | Shamaie |
| 8,903,233 B1 | 12/2014 | Huang et al. |
| 2005/0001924 A1 | 1/2005 | Honda |
| 2005/0094019 A1* | 5/2005 | Grosvenor ............ G03B 17/00 348/335 |
| 2005/0110890 A1 | 5/2005 | Sasaki et al. |
| 2005/0185083 A1 | 8/2005 | Okawara |
| 2006/0093343 A1 | 5/2006 | Horii et al. |
| 2008/0219654 A1 | 9/2008 | Border et al. |
| 2009/0322932 A1 | 12/2009 | Ishiwata |
| 2010/0118292 A1 | 5/2010 | Park et al. |
| 2011/0018972 A1* | 1/2011 | Pan .................... H04N 5/23212 348/47 |
| 2011/0149045 A1 | 6/2011 | Wuerz-Wessel et al. |
| 2011/0310290 A1 | 12/2011 | Oouchida |
| 2012/0113300 A1 | 5/2012 | Hamano |
| 2013/0038723 A1* | 2/2013 | Tsutsumi .................. G01S 5/16 348/139 |
| 2013/0258141 A1 | 10/2013 | Kim et al. |
| 2013/0322862 A1 | 12/2013 | Hsu |
| 2013/0329106 A1 | 12/2013 | Bigioi et al. |
| 2014/0205141 A1 | 7/2014 | Gao et al. |
| 2014/0375872 A1 | 12/2014 | Honjo et al. |
| 2015/0124157 A1 | 5/2015 | Hongu et al. |
| 2016/0014328 A1 | 1/2016 | Rokutanda |
| 2017/0003573 A1 | 1/2017 | Dayana et al. |

\* cited by examiner

SYSTEMS AND METHODS FOR AUTOFOCUS TRIGGER

CROSS REFERENCE TO RELATED APPLICATIONS

The present application is a continuation of U.S. patent application Ser. No. 14/791,035, filed on Jul. 2, 2015, entitled "SYSTEMS AND METHODS FOR AUTOFOCUS TRIGGER," the disclosure of which is hereby incorporated by reference herein.

BACKGROUND

Field

This disclosure relates generally to systems and methods for providing an autofocus trigger to an autofocusing system of an imaging device. In particular, the systems and methods provide improved autofocus triggering applicable in still image and video photography.

Description of the Related Art

Autofocus (AF) systems are ubiquitous in imaging devices, including standalone cameras and cameras incorporated into mobile computing devices (for example, cell phones and tablets). The performance of an autofocus system can be characterized in terms of focus and trigger. "Focus" refers to an actual autofocus operation where a lens may be moved to different lens positions to determine the best focus for the current scene. "Trigger" refers to criteria which determine when and/or under what condition an autofocus process should start. Prior approaches to "trigger" functionality include, for example, monitoring a scene in the field-of-view (FOV) of an imaging device, detecting scene changes, and if the scene changes are significant, starting or triggering the autofocus operation. Problems with some current trigger functionality include missing a scene change or false detection of scene changes triggering the autofocus operation too often or too infrequently.

A change in the scene can be a result of a moving object within the scene and/or an imaging device being moved such that it points to a different scene. Some existing autofocus trigger systems monitor metrics, the changes in which can indicate a possibility of a change in a scene requiring triggering a refocusing operation. These metrics can include for example, contrast, luma or exposure, and/or various scene descriptors.

Often the metrics used in prior approaches to triggering autofocus operation are only indirectly or tangentially related to whether or not a refocusing operation is needed. For example, in some approaches a change in exposure is used as a metric to indicate when an AF trigger may be necessary. However, an imaging device which relies on the change in exposure to trigger AF operation, can unnecessarily trigger AF operation when the source of lighting on the object is changed, for example when another object momentarily casts a shadow on the object to be photographed or filmed. Conversely, an AF trigger functionality based on exposure alone can fail to trigger AF operation that might be needed if the object moves position in a way that the exposure is constant while the object is out of focus in the object's new position. Consequently, in some prior approaches, the autofocus operation of an imaging device is triggered unnecessarily, too often or conversely not frequently enough. Accordingly, there is a need for improved systems and methods for determining the timing of triggering of an autofocus operation of an imaging device where the autofocus operation is triggered reliably and when needed.

SUMMARY

The systems, methods and devices of this disclosure each have several innovative aspects, no single one of which is solely responsible for the desirable attributes disclosed herein.

One innovative aspect of the subject matter described in this disclosure can be implemented in a system that includes a first lens, a memory component configured to store lens parameters of the first lens and regions of focus corresponding to the lens parameters, a processor coupled to the memory and the first lens. The processor may be configured to focus the first lens on a target object at a first instance of time, receive information indicative of distances from an imaging device to the target object over a period of time, the first instance of time included in the period of time, obtain lens parameters of the first lens at the first instance of time, determine a region of focus based on the distance at the first instance of time and lens parameters at the first instance of time, and trigger the first lens to re-focus on the target object if the distance to the target object indicates the target object is outside of the region of focus and the distance to the target object is unchanged for a designated time period.

Such systems may include additional features or fewer features. In various embodiments of such systems, the lens parameters may include information indicative of an aperture of the first lens and information indicative of a focal length of the first lens at the first instance of time. In some embodiments, the processor is further configured to access the memory component to retrieve lens parameters of the first lens and use the retrieved lens parameters to determine the region of focus. The memory component may be configured with lens parameters and associated regions of focus, and the processor is further configured to retrieve from the memory component a region of focus associated with the lens parameters of the first lens at the first instance of time. The designated time period may include a predetermined time period. The region of focus may be a predetermined distance within a depth of field associated with the lens parameters of the first lens. The system may include a range finding system coupled with, or in communication with, the processor, the range finding system configured to send to the processor information indicative of distance from the imaging device to the target object. The range finding system may include the first lens and a second lens, and the range finding system is configured to determine information indicative of the distance from the imaging device to the target object based on a disparity between an image generated using the first lens and an image generated using the second lens. In some embodiments the range finding system includes a light emitter. The range finding system may be configured to determine information indicative of the distance from the imaging device to the target object based on receiving light that is emitted by the light emitter and reflected from the target object.

Another innovation includes a method of focusing that includes storing, in a memory component, lens parameters of a first lens and regions of focus corresponding to the lens parameters, focusing the first lens on a target object at a first instance of time, receiving information indicative of distances from an imaging device to the target object over a period of time, the first instance of time included in the period of time, obtaining lens parameters of the first lens at the first instance of time, determining a region of focus based on the distance at the first instance of time and lens parameters at the first instance of time, and triggering the first lens to re-focus on the target object if the distance to the target object indicates the target object is outside of the region of focus and the distance to the target object is unchanged for a designated time period.

Such methods may include additional features or fewer features. In various embodiments of such methods, the lens parameters may include information indicative of an aperture of the first lens and information indicative of a focal length of the first lens at the first instance of time. In some embodiments, the method further includes accessing the memory component to retrieve lens parameters of the first lens and use the retrieved lens parameters to determine the region of focus. In some embodiments, the designated period of time includes a predetermined time period. In some embodiments, the region of focus is a predetermined distance within a depth of field associated with the lens parameters of the first lens. Some embodiments further include determining information indicative of the distance from the imaging device to the target object based on a disparity between an image generated using the first lens and an image generated using a second lens. Some embodiments further include determining information indicative of the distance from the imaging device to the target object based on emitting light to the target object and receiving reflected light from the target object.

Another innovation includes a system for focusing that includes means for storing lens parameters of a first lens and regions of focus corresponding to the lens parameters; means for focusing the first lens on a target object at a first instance of time, means for receiving information indicative of distances from an imaging device to the target object over a period of time, the first instance of time included in the period of time, means for obtaining lens parameters of the first lens at the first instance of time, means for determining a region of focus based on the distance at the first instance of time and lens parameters at the first instance of time, and means for triggering the first lens to re-focus on the target object if the distance to the target object indicates the target object is outside of the region of focus and the distance to the target object is unchanged for a designated time period.

Such systems may include additional features or fewer features. The lens parameters may include information indicative of an aperture of the first lens and information indicative of a focal length of the first lens at the first instance of time. Some embodiments of such systems further include means for retrieving lens parameters of the first lens and using the retrieved lens parameters to determine the region of focus. In some embodiments, the designated period of time comprises a predetermined time period. In some embodiments, the region of focus is a predetermined distance within a depth of field associated with the lens parameters of the first lens. Some embodiments further include means for determining information indicative of the distance from the imaging device to the target object based on a disparity between an image generated using the first lens and an image generated using a second lens. Some embodiments further include means for determining information indicative of the distance from the imaging device to the target object based on emitting light to the target object and receiving reflected light from the target object.

Another innovation includes a non-transitory computer storage that stores executable program instructions that, when executed by one or more computing devices, configure the one or more computing devices to perform operations including storing, in a memory component, lens parameters of a first lens and regions of focus corresponding to the lens parameters, focusing the first lens on a target object at a first instance of time, receiving information indicative of distances from an imaging device to the target object over a period of time, the first instance of time included in the period of time, obtaining lens parameters of the first lens at the first instance of time, determining a region of focus based on the distance at the first instance of time and lens parameters at the first instance of time, and triggering the first lens to re-focus on the target object if the distance to the target object indicates the target object is outside of the region of focus and the distance to the target object is unchanged for a designated time period. The lens parameters may include information indicative of an aperture of the first lens and information indicative of a focal length of the first lens at the first instance of time. The operations may further include accessing the memory component to retrieve lens parameters of the first lens and use the retrieved lens parameters to determine the region of focus. In some embodiments, the designated period of time comprises a predetermined time period. In some embodiments, the region of focus is a predetermined distance within a depth of field associated with the lens parameters of the first lens. Some embodiments further include determining information indicative of the distance from the imaging device to the target object based on a disparity between an image generated using the first lens and an image generated using a second lens. Some embodiments further include determining information indicative of the distance from the imaging device to the target object based on emitting light to the target object and receiving reflected light from the target object.

Details of one or more implementations of the subject matter described in this disclosure are set forth in the accompanying drawings and the description below. Although the examples provided in this disclosure are primarily described in terms of an imaging device implemented in a mobile device (for example, a cell phone or a camera), the concepts provided herein may apply to other types of systems with or within which an imaging device is implemented. Other features, aspects, and advantages will become apparent from the description, the drawings and the claims. Note that the relative dimensions of the following figures may not be drawn to scale.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
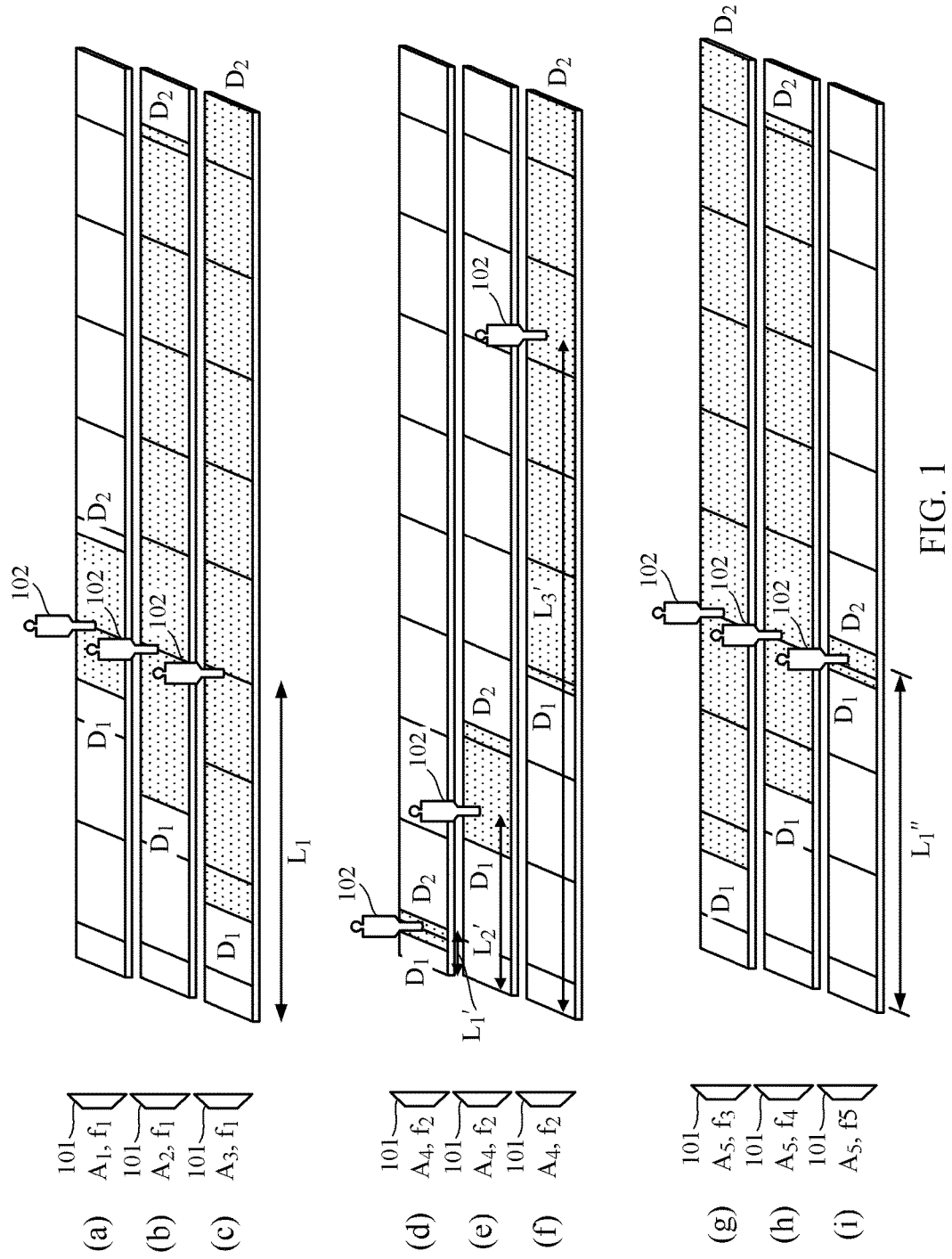
FIG. 1 illustrates an overview of the relationship between a region of focus and exemplary factors that affect it.

The following detailed description is directed to certain specific embodiments of the invention. However, the invention can be embodied in a multitude of different ways. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Further, the systems and methods described herein may be implemented on a variety of different computing devices that hosts a camera. These include mobile phones, tablets, dedicated cameras, wearable computers, personal computers, photo booths or kiosks, personal digital assistants, ultra-mobile personal computers, and mobile internet devices. They may use general purpose or special purpose computing system environments or configurations. Examples of computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Various definitions of depth of field (DOF) in an imaging context exist. For example, the depth of field of a lens can be defined as a distance between the nearest and furthest objects in a scene which appear reasonably sharp in an image or a video frame of that scene captured by the lens. The reasonableness of the sharpness can be a subjective factor and can differ in various implementations of an imaging device and can even depend on factors unrelated to the imaging device, for example a viewer's visual acuity, viewing conditions and other factors.

Depth of field can be related to various optical characteristics of a lens or imaging device as well as other factors. Some of these characteristics and factors will be described herein. For example, in optics, a hyperfocal distance (H) of a lens can be defined as the distance beyond which all objects can be reasonably sharp when the lens is focused on infinity. Other definitions for hyperfocal distance of a lens also exist. These definitions can depend on what level of sharpness is considered reasonable or acceptable in an optical or imaging system.

A metric sometimes related to expressing the desired degree of sharpness is the circle of confusion. A camera can form an image of an object on a medium, for example a film or a digital photo sensor, by focusing light rays reflected from the object through a lens onto the medium. Although "ideal" lenses have no aberrations, real lenses may not focus all light rays from a point on the object perfectly into a point on the image. Therefore, such lenses may form a spot or circle in an image corresponding to a point on the object they image. In other words, light rays reflected from a point on the object may not come to a perfect focus, thereby forming a circle or a spot on the medium as opposed to a single point. In this scenario, the circle of confusion can be defined as the largest acceptable circle or spot corresponding to a point on an object being imaged. Circle of confusion in turn can depend on factors such as visual acuity of a viewer, viewing conditions, amount of magnification and the size and shape of the medium (for example, image format).

Another metric related to the depth of field of a lens can be the lens focal length (f). The focal length of a lens can be defined as the distance between the center of the lens and a point on which collimated rays of light can be brought into focus after traveling through the lens.

Another parameter of a lens or an imaging system related to the depth of field can be lens aperture. The lens physical aperture can refer to the diameter of an opening or aperture through which an imaging device can admit light. Additionally, an imaging device or lens can include various elements, for example a lens diaphragm, by which the imaging device or lens can manipulate the amount of light it admits to the imaging device. The term physical aperture stop can be used to refer to these various elements. An effective lens aperture or entrance pupil in an optical system can be defined as the optical image of a physical aperture stop as observed through the front of the optical system. The lens aperture can sometimes be expressed in terms of a lens f-number (f/N) or relative aperture. The f-number can be defined as the ratio of a lens's focal length to the diameter of the effective lens aperture or entrance pupil. For example, if a lens's focal length is 10 millimeter (mm) and the diameter of its effective lens aperture or entrance pupil is 5 mm, the f-number is 2 and the aperture diameter or lens aperture is f/2. In optics, the term lens aperture can be used with relative terminology, generally referring to a lens setup and the amount of light the lens admits as a result of that setup. For example, a "wide"

lens aperture admits more light compared to a "narrow" (or "small") lens aperture. A wide lens aperture can correspond to small f-numbers, for example, f/1.4, f/1.8 or f/2. A narrow or small lens aperture can correspond to large f-numbers, for example, f/11, f/18 or f/22.

Another factor related to the depth of field is the focusing distance (s). When an optical system focuses the lens on an object, the lens is moved relative to the object and a medium (for example a film or digital image sensor) until a sharp image of the object is formed on the medium. The focusing distance (s) can be defined as the distance of an object to the center of a lens when a sharp image of the object is formed on a medium of an imaging device including the lens.

Finally, the depth of field of a lens can be expressed as the difference between a far distance of acceptable sharpness (Df) and a near distance of acceptable sharpness (Dn), where "near" and "far" are used relative to the center of the lens. In some examples, the following equations can yield the relationships used to calculate the distances Dn and Df and consequently the depth of field.

$$H = \frac{f^2}{Nc} + f \quad \text{Equation (1)}$$

$$D_n = \frac{s(H-f)}{H+s-2f} \quad \text{Equation (2)}$$

$$D_f = \frac{s(H-f)}{H-s} \quad \text{Equation (3)}$$

$$DOF = D_f - D_n \quad \text{Equation (4)}$$

In Equation (1) above, H denotes the hyperfocal distance, f denotes the focal length, N denotes the f-number, and c denotes the diameter of the circle of confusion. In Equation (2) above, Dn denotes the near distance of acceptable sharpness relative to the center of the lens. This can mean objects located between the center of the lens and the distance Dn from the center of the lens, when imaged, can appear un-sharp. In Equation (3) above, Df denotes the far distance of acceptable sharpness. This can mean objects located beyond the distance Df from the center of the lens, when imaged, can appear un-sharp. Finally, in Equation (4), the difference between the distances Df and Dn can denote the depth of field or DOF.

As can be observed from the above description, knowing the exemplary lens characteristics and parameters described above, one of ordinary skill in the art can use the relationships expressed in Equations (1)-(4) to determine a depth of field.

Of course, one of ordinary skill in the art would recognize that other definitions of various characteristics and parameters discussed above may be available. These alternative definitions can in the embodiments described herein without departing from the spirit of this disclosure.

Exemplary embodiments of imaging systems and methods described herein can use a region of focus of a lens relative to a distance of an object from the lens to determine when an autofocus operation of the lens should be triggered. The region of focus can be related to the depth of field. In some embodiments, the region of focus can be the same as the depth of field. In other embodiments, the region of focus can be a known and/or a predetermined distance relative to the depth of field. For example, if the depth of field of a lens is the distance from 1 meter (m) to 5 m from the center of the lens, the region of focus can be defined as a distance encompassing the depth of field by a margin of 0.2 m. In this scenario, the region of focus can be from 0.8 m to 5.2 m relative to the center of the lens. Alternatively, the region of focus can be defined to be encompassed by and be within the depth of field by a predetermined distance. In this scenario, if the predetermined distance is 0.3 m, the region of focus can be from 1.3 m to 4.7 m relative to the center of the lens.

Alternatively, the region of focus can be defined asymmetrically relative to the near distance Dn of acceptable sharpness and the far distance Df of acceptable sharpness. For example, the depth of field of a lens can be 4 m starting from the near distance Dn, 1 m from the center of the lens to the far distance Df, 5 m from the center of the lens. In this scenario, the region of focus can be defined to start from a predetermined distance or percentage of distance from the inside of the depth of field to infinity. For example, the region of focus can start from a distance 4% of the depth of field from the near distance Dn. In this example, the region of focus can start from 1.16 cm from the center of the lens to infinity. One of ordinary skill in the art would recognize that other combination of distances relative to the depth of field and near and far distances Dn and Df are also possible without departing from the spirit of this disclosure to achieve various sensitivities when implementing an autofocus trigger operation according to the disclosed embodiments.

FIG. 1 illustrates aspects of the relationship between a region of focus and some exemplary factors that affect it. These factors can include, focusing distance, lens focal length and lens aperture. As will be described, a region of focus can be inversely proportional to lens aperture or the amount of light a lens admits, proportional to focusing distance and inversely proportional to lens focal length.

FIG. 1 illustrates an object 102 to be captured in an image or a plurality of images. The disclosure herein may refer to an object being imaged when capturing an image or a plurality of images of the object. Additionally, the focusing distance of a lens 101 in the illustrations in FIG. 1 can be the same as the distance from the object 102 to the center of the lens 101. In other words, in FIG. 1, the plane of focus of the lens 101 can be on where the object 102 is located. In FIG. 1, the characteristics of the lens 101 can be configured or manipulated in order to capture an image. For example, the lens 101 can be configured with different values for lens aperture (denoted by A) and lens focal length (denoted by f). In FIG. 1, the region of focus of the lens 101 is illustrated by a region between the distances D1 and D2 with respect to the center of the lens 101.

FIGS. 1(a)-1(c) illustrate examples of the relationship between the region of focus of the lens 101 and the lens aperture when the same focusing distance and lens focal length are used to image the object 102. FIGS. 1(d)-1(f) illustrate the relationship between the region of focus of the lens 101 and the focusing distance when the same lens focal length and lens aperture are used to image the object 102. FIGS. 1(g)-1(i) illustrate the relationship between the region of focus of the lens 101 and the lens focal length when the same focusing distance and lens aperture are used to image the object 102.

In FIG. 1(a), the lens 101 is configured with a lens aperture A1 and focal length f1 to capture the object 102 in an image. The focusing distance is L1. In FIG. 1(b), the lens 101 is configured with a lens aperture A2 and the focal length f1 to capture the object 102 in an image. The focusing distance can is L1, and the lens aperture A2 is smaller than A1. In FIG. 1(c), the lens 101 is configured with a lens aperture A3 and focal length f1 to capture the object 102 in an image. The focusing distance is L1, and the lens aperture A3 is smaller than lens apertures A1 and A2 used in the lens configurations in FIGS. 1(a) and 1(b). As can be observed from FIGS. 1(a)-1(c), the region of focus D1-D2 is inversely proportional to the lens aperture. As shown in FIGS. 1(a)-1(c), for A1>A2>A3, the region of focus D1-D2 corresponding to the widest lens aperture A1 is shallower than the region of focus D1-D2 corresponding to the lens aperture A2, and the region of focus D1-D2 corresponding to the smallest lens aperture A3 is the deepest among the regions of focus shown in FIGS. 1(a)-1(c).

In FIG. 1(d), the lens 101 is configured with a lens aperture A4 and focal length f2 to capture the object 102 in an image. The focusing distance is L1'. In FIG. 1(e), the lens 101 is configured with the lens aperture A4 and the focal length f2 to capture the object 102 in an image. The focusing distance is L2' where L2'>L1'. In FIG. 1(f), the lens 101 is configured with the lens aperture A4 and focal length f2 to capture the object 102 in an image. The focusing distance is L3', where L3'>L2'. As can be observed from FIGS. 1(d)-1(f), the region of focus D1-D2 is proportional to the focusing distance. As shown in FIGS. 1(d)-1(f), for L1'<L2'<L3', the region of focus D1-D2 corresponding to the shortest focusing distance L1' is shallower than the region of focus D1-D2 corresponding to the focusing distance L2', and the region of focus D1-D2 corresponding to the longest focusing distance L3' is the deepest among the regions of focus shown in FIGS. 1(d)-1(f).

In FIG. 1(g), the lens 101 is configured with a lens aperture A5 and focal length f3 to capture the object 102 in an image. The focusing distance is L1". In FIG. 1(h), the lens 101 is configured with the lens aperture A5 and the focal length f4 to capture the object 102 in an image. The focusing distance is L1", and the lens focal length f4 is longer than the lens focal length f3. In FIG. 1(i), the lens 101 is configured with the lens aperture A5 and focal length f5 to capture the object 102 in an image. The focusing distance is L1" and the lens focal length f5 is longer than the lens focal length f4. As can be observed from FIGS. 1(g)-1(i), the region of focus D1-D2 is inversely proportional to the lens focal length. As shown in FIGS. 1(g)-1(i), for f3<f4<f5, the region of focus D1-D2 corresponding to the shortest focal length f3 is the deepest among the regions of focus shown in FIGS. 1(g)-1(i), and the region of focus D1-D2 corresponding to the longest focal length is the shallowest among the regions of focus shown in FIGS. 1(d)-1(f).

Figure 2:
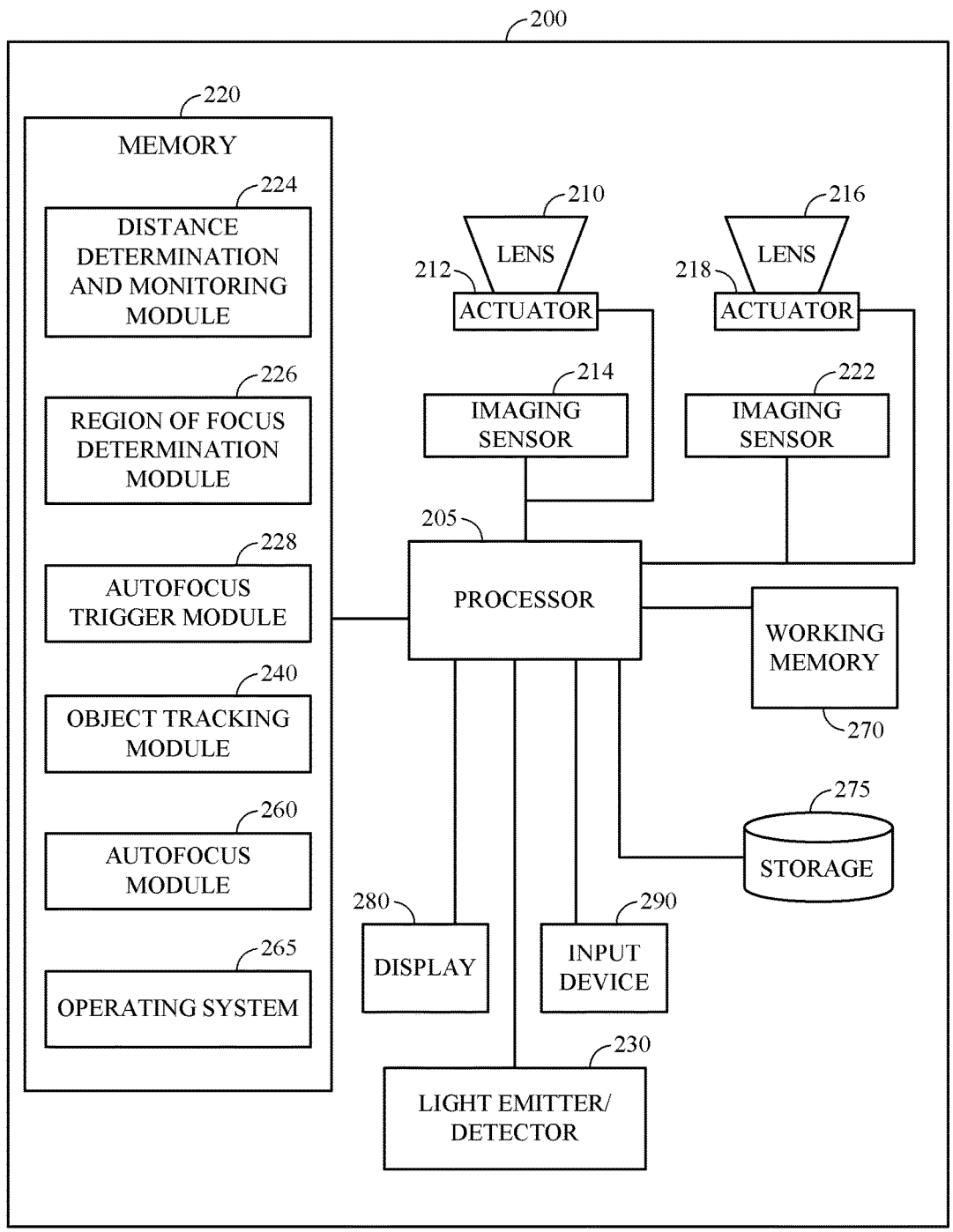
FIG. 2 is a schematic illustrating an example of an imaging device according to an embodiment.

FIG. 2 is an example of a block diagram illustrating an embodiment of an imaging device 200 which includes an autofocus trigger functionality according to an embodiment. The imaging device 200 can include a processor 205 operatively connected to an image sensor 214, lens 210, actuator 212, working memory 270, storage 275, display 280, and input device 290. Optionally, the imaging device 200 can further include one or more additional lenses, for example a second lens 216, second actuator 218 and second image sensor 222. The inclusion of the second lens 216 and its associated components can assist in improving the functionality of the imaging device 200. For example, the second lens 216 in conjunction with the lens 210 can assist in determining the location or distance of an object to the imaging device 200 via, for example, stereo disparity. As an alternative to including a second lens and/or in addition to utilizing a second lens, the imaging device 200 can optionally include a light emitter/detector 230 to aid in determining the location or distance of an object to the imaging device 200.

In addition, the processor 205 is connected to a memory 220. The memory 220 can store several modules that in turn store data values defining instructions to configure the processor 205 to perform functions of the imaging device 200. The memory 220 can include an object tracking module 240, autofocus module 260, and an operating system 265. While FIG. 2 illustrates numerous independent modules, it will be understood that any of the modules shown may be included as sub-modules, either individually or in combination. The memory 220 can additionally include a distance determination and monitoring module 224, region of focus determination module 226 and autofocus trigger module 228.

In an illustrative embodiment, light enters the lens 210, and if used, the second lens 216 and is focused on the image sensor 214, and if used, the second image sensor 222. In some embodiments, the image sensor 214 utilizes a charge coupled device (CCD). In some embodiments, the image sensor 214 utilizes a complementary metal-oxide semiconductor (CMOS) sensor. The lens 210 is coupled to the actuator 212, and is moved by the actuator 212. The actuator 212 is configured to move the lens 210 in a series of one or more lens movements during an autofocus search operation. Similar functionality, as described above, can also be implemented for the second lens 216, second actuator 218 and second imaging sensor 222 if the imaging device 200 is implemented with one or more additional lenses.

The display 280 illustrated in the embodiment of FIG. 2 is configured to display images and frames captured via the lens 210 (and if used, the second lens 216) and may also be utilized to implement configuration functions of the imaging device 200.

Still referring to the embodiment of FIG. 2, the working memory 270 may be utilized by the processor 205 to store data dynamically created during operation of the imaging device 200. For example, instructions from any of the modules stored in the memory 220 (discussed below) may be stored in the working memory 270 when executed by the processor 205. The working memory 270 may also store dynamic run time data, such as stack or heap data utilized by programs executing on processor 205. The storage 275 may be utilized to store data created by the imaging device 200. For example, images captured via the lens 210 (and if used, the second lens 216) may be stored on the storage 275. Additionally, the storage 275 may be used to store lens characteristics information such as a database or look-up-table containing information used in determining a region of focus based on lens parameters. The lens characteristics can include, for example, brand, manufacturer and other hardware data of the lens 210 (and if used, the second lens 216) from which a region of focus can be determined given a set of lens parameters such as focusing distance, lens focal length and lens aperture. The storage 275, can for example, include a look-up-table relating lens characteristics for the lens 210 (and if used, the second lens 216) with lens parameters and a corresponding region of focus.

The memory 220 may be considered a computer readable media and can store several modules. The modules store data values defining instructions for the processor 205. These instructions configure the processor 205 to perform functions of the imaging device 200. For example, in some aspects, the memory 220 may be configured to store instructions that cause the processor 205 to perform a process 600, or portions thereof, as described below and as illustrated in relation to FIG. 6. In the illustrated embodiment, the memory 220 can include a distance determination and monitoring module 224, a region of focus determination module 226, an autofocus trigger module 228, an object tracking module 240, an autofocus module 260, and an operating system 265.

The operating system 265 can include instructions that configure the processor 205 to manage the hardware and software resources of the imaging device 200.

Instructions in the object tracking module 240 may configure the processor 205 to provide object tracking capability. In some embodiments, the object may be tracked as it moves around the display 280 or as it moves within a field of view (FOV) of the lens 210 (or if used, the second lens 216). In some embodiments, tracking imaging devices are integrated with the present disclosure. For example, U.S. Pat. No. 8,483,437, the contents of which are incorporated herein in their entirety, discloses features for tracking objects in images using training images; U.S. Patent Application Pub. No. 2013/0258141, the contents of which are incorporated herein in their entirety, discloses features for detecting and tracking an object in video frames and rejecting false positives; U.S. Patent Application Pub. No. 2014/0205141, the contents of which are incorporated herein in their entirety, discloses features for tracking an object in video frames to generate a tacking result; and U.S. Pat. No. 8,249,299, the contents of which are incorporated herein in their entirety, discloses features for identifying and tracking objects in a video. Instructions in the object tracking module 240 represents one means for tracking a user selected object.

In some embodiments, an imaging device may be configured to capture multiple images or frames of an object. The object can then be tracked, via a tracking module of the imaging device, through the multiple frames to provide tracking data. The tracking module may include technologies such as package tracking, laser tracking, and the like. For example, the tracking module may implement Touch-to-Track® developed by Qualcomm Technologies, Inc.

The autofocus module 260 illustrated in the embodiment of FIG. 2 can include instructions that configure the processor 205 to control the lens 210 (and if used, the second lens 216) to achieve autofocus. Instructions in the autofocus module 260 may configure the processor 205 to effect a lens position for the lens 210 (and if used, the second lens 216). In some aspects, instructions in the autofocus module 260 may configure the processor 205 to control the lens 210 (and if used, the second lens 216), in conjunction with the image sensor 214 (and if used, the second image sensor 222) to capture an image. Therefore, instructions in the autofocus module 260 may represent one means for capturing an image with the image sensor 214 and lens 210 (and if used, the second image sensor 222 and the second lens 216).

When an autofocus operation is triggered, a variety of autofocus systems and techniques may be used to autofocus one or more lenses 204 and 206 of the imaging device 201. In many applications, autofocusing may be performed in an imaging device by a variety of types of actuators. Imaging devices focus scenes onto image sensors with lenses that move within a movable range to enable focusing. Autofocus imaging devices move the lens using voice coil motors (VCM), piezo, or a micromechanical system (MEMS) component.

A variety of autofocus methods may be used in modern digital imaging devices to determine the direction and how far the mechanical movement will move the lens. For example, because images with higher contrast may tend to have a sharper focus, some autofocus methods seek a focus position that provides an image with the highest contrast. This may be known as a focus value algorithm, where focus values at different lens positions are compared to determine which image has the highest contrast. Another example of an autofocus method is based on object depth estimation, where the algorithm directly moves a lens to an estimated position based on the estimated depth or location of the target object from the imaging device. Based on the confidence in the estimation, minimal contrast based autofocusing may be used. However, when the optimal lens position, or optimal focus position, for an optimal focus is not known the imaging device uses the contrast based, or focus value, autofocus method. The optimal lens position refers to the lens position which results in maximum focus value or highest contrast value.

Regardless of the system or technique used to autofocus one or more of the lenses 204 and 206, those systems or techniques ultimately configure the lenses with lens parameters, for example focusing distance, lens focal length and lens aperture to achieve autofocus. In certain embodiments, a fixed lens focal length may also be used. As described herein, referring to the lens aperture as one of the lens parameters can refer to any indicia of aperture as it relates to a lens or an imaging device. As described above, these can include, for example, physical aperture, physical aperture stop, effective lens aperture, entrance pupil, f-number, relative aperture, or other definitions generally related to the aperture of an imaging device and the amount of light the imaging device admits through an opening or aperture.

In some aspects, the instructions in the autofocus module 260 can determine the lens position information. The lens position information may include a current lens position, a target lens position, and an autofocus search operation direction determination. In some aspects, instructions in the autofocus module 260 may represent one means for initializing an autofocus search operation. In some aspects, instructions in the autofocus module 260 may represent one means for determining a magnitude and/or direction of lens movement for an autofocus search operation. When an autofocus operation is triggered via the autofocus trigger module 228 and when the autofocus module 260 has affected and concluded an autofocus operation, the lens parameters corresponding to that autofocus operation can be determined. The lens parameters can include focusing distance, lens focal length and lens aperture. The lens parameters information can be communicated to the region of focus determination module 326.

The distance determination and monitoring module 224 can include instructions to configure the processor 205 to determine the distance of an object from the imaging device 200. For example, the distance determination and monitoring module 224 may include instructions to measure the distance of an object using stereo disparity when a second lens 216 is used. A disparity of a feature in an object, for example, a central point on the object, can be defined as the difference in its horizontal positions as observed from the lens 210 and the second lens 216. For example, a central point on the object can form a first image on the first image sensor 214 and a second image on the second image sensor 218. The horizontal distance between the first and second images can be defined as the disparity. A stereo baseline can be defined as the distance which separates the lens 210 and the second lens 216. In some implementations, knowing this information and the focal lengths of the lenses 210 and 216, the distance determination and monitoring module 224 can configure the processor 205 to determine the distance from an object by multiplying the stereo baseline by the focal length and dividing the result by the disparity.

The distance determination and monitoring module 224 may include instructions to configure the processor 205 to determine the distance to an object by communicating with the object tracking module 240. The distance determination and monitoring module 224 may include instructions to configure the processor 205 to determine the distance to an object by communicating with the autofocus module 260. The object distance may be a function of the position of the lens, where the position of the lens may be obtained from the autofocus module 260.

The distance determination and monitoring module 224 may include instructions to configure the processor 205 to determine the distance to an object by measuring the time taken for a light pulse, for example a light pulse transmitted by a laser beam, to travel to an object and back. With the speed of light known and a measurement of the time taken, a distance to the object can be determined. Alternative techniques using laser range finding technology can also be used. The instructions in the distance determination and monitoring module 224 can configure the processor 205 to cause the light emitter/detector 230 to transmit a light signal (or radiation), for example a light pulse or laser beam from the imaging device 200 to an object to be imaged, detect the light pulse or laser beam reflected back from the object, determine the total travel time for the light pulse or laser beam from the imaging device 200 to the object to be imaged and back from the object to be imaged to the imaging device 200. The object distance can then be determined by multiplying the speed of light by the total travel time. The speed of light can be related to the medium or environment in which the imaging device 200 and/or the object to be imaged are located.

The region of focus determination module 226 can include instructions to configure the processor 205 to determine a region of focus corresponding to a current focusing distance, lens focal length and lens aperture. For the purpose of the description herein, the combination of parameters that collectively determine a region of focus for a given lens and focusing distance can be referred to as lens parameters. Examples of lens parameters can include focusing distance, lens focal length and lens aperture. Some lens characteristics also factor into the determination of a region of focus. These characteristics include, for example, the diameter of the circle of confusion for the lens system 210 and if used the second lens 216.

Figure 3:
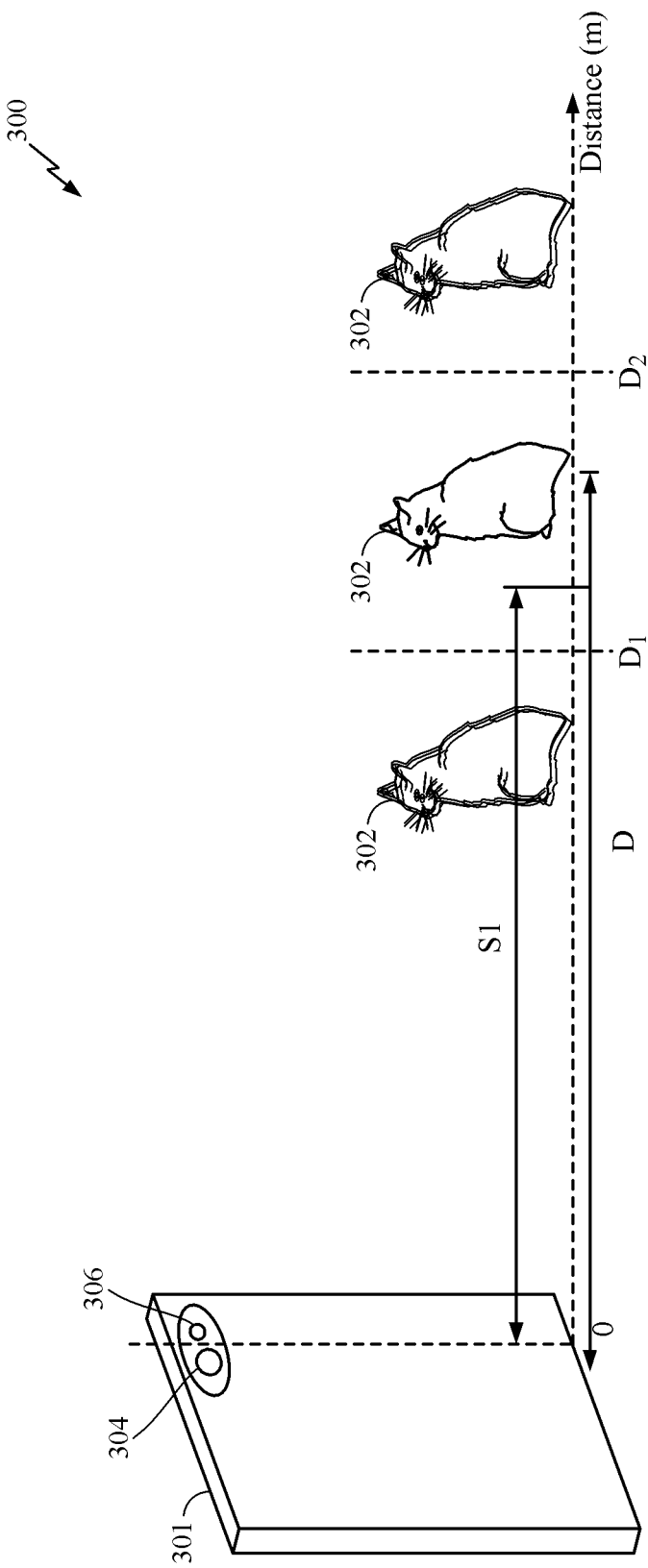
FIG. 3 is a diagram illustrating an example of an imaging device according to an embodiment and an object to be imaged at various distances relative to the imaging device.

FIG. 3 shows a diagram 300 illustrating an imaging device 301 and an object 302 to be imaged. The imaging device 301 can be implemented within a standalone still or video camera or within a wireless communication device such as a mobile phone, tablet or the like. The features described in relation to the embodiment of FIG. 2 can be used to implement the imaging device 301. The imaging device 301 can optionally include one or more image capturing lenses, for example, a lens 304 and 306. In some embodiments, the lenses 304 and 306 may have different characteristics. For example, the lens 304 and its associated components can constitute a main camera of high quality and resolution while the lens 306 and its associated components can be an auxiliary camera of low quality and resolution. However, identical or similar lenses or cameras can alternatively be used. One or more of the lenses 304 and 306 can be focused on a focal plane at a focusing distance S1 from the imaging device 301. As described above, for a given set of lens parameters (for example, focusing distance, lens focal length and lens aperture), there is a region of focus D1-D2 where the object 302 appears reasonably in focus for the imaging device 301. Conversely, for the same lens parameters, if the object 302 is outside the region of focus D1-D2, the object 302 appears out of focus for the imaging device 301. The lens parameters, as discussed above, can include focusing distance, lens focal length and lens aperture. Knowing these lens parameters a region of focus D1-D2 can be determined.

Additionally, a distance D from the object to the imaging device 301 can be determined. The imaging device 301 can include a distance determination and monitoring module 224 and object tracking module 240 as described above in relation to the embodiment of FIG. 2. Accordingly, the distance D can be determined by tracking the object 302 and determining its distance from the imaging device 301. The imaging device 301 can also be configured to determine parameters related to determining a current region of focus by communicating with for example an autofocus module 260. These parameters can include, for example, the focusing distance, lens focal length and lens aperture for the lenses 201 and 204. The imaging device 301 can also be configured to include a region of focus determination module 226 to determine a region of focus D1-D2 corresponding to the current focusing distance, lens focal length and lens aperture. Consequently, the imaging device 301 can monitor or determine the object distance D in relation to the region of focus D1-D2. When the imaging device 301 and/or the object 302 change position such that the object distance D falls outside of the region of focus D1-D2, an autofocus operation of the imaging device 301 can be triggered.

In some embodiments, when the object distance D falls outside of the region of focus D1-D2, for example due to the movement of the imaging device 301 and/or the object 302 relative to each other, an autofocus operation may still not be triggered because the object distance D may still be changing. In this scenario, it may be possible for the object distance D to settle in a final position such that the object distance D may fall again inside the current region of focus D1-D2 and a new autofocus operation may not be needed. Alternatively, if the object distance is still changing, triggering an autofocus operation and obtaining a new autofocus and lens position may be unnecessary if the object distance D continues to fall outside of the newly obtained region of focus such that another autofocus trigger may be needed. Therefore, in some embodiments, in addition to detecting an object distance D falling outside of a region of focus, a further determination can be made as to whether the object distance has stabilized. In this scenario, for example, the object distance D can be further monitored. If the distance D has not changed after a designated period of time, or no other signals indicating a change in the object distance has been detected, then an autofocusing operation of the imaging device 301 can be triggered. The designated period of time may be a predetermined amount of time period stored in memory. Alternatively, the designated time period may be dynamically determined by the imaging device 301.

Referring to FIGS. 2 and 3, as described above, the imaging device 301 can include the features of the imaging device 200. For example, the lens 304 can be implemented with the lens 210, and the lens 306 can be implemented with the lens 216. However, the imaging device 301 can alternatively be implemented with only one lens. Still referring to FIGS. 2 and 3, the information on the current focusing distance S1 can be obtained from the autofocus module 260. Additionally, the region of focus determination module 226 can interface with a database, lookup table or the like containing lens characteristics (or hardware) information in order to configure the processor 205 to determine a region of focus D1-D2. For example, the region of focus determination module 226 can return stored information on the relationship between focusing distance, lens focal length and lens aperture as they relate to the current position and setup of the lens 210 and the second lens 216. The region of focus determination module 226 can store processor instructions specific to the characteristics of the lens 210 and 216. These processor instructions can configure the processor 205 to accept as input the current lens parameters such as focusing distance, lens focal length and lens aperture and output a corresponding region of focus D1-D2.

The autofocus trigger module 228 can include instructions to configure the processor 205 to determine whether a new autofocus operation of the imaging device 200 should be triggered. Referring to FIGS. 2 and 3, the autofocus trigger module 228 can include instructions to configure the processor 205 to compare the object distance D with the region of focus. If the object distance D falls outside the region of focus, the processor 205 can trigger a new autofocusing operation of the imaging device 200. As described above, in some embodiments, the autofocus trigger module 228 can include instructions to configure the processor 205 to continuously monitor the object distance D and if the object distance D is stabilized, for example, the object distance D has not changed after a designated period of time or the object distance D has not changed within a designated number of captured image frames, and no other signals indicating a change in object distance D has been detected, the processor 205 can trigger a new autofocus operation of the imaging device 200. In this scenario, if the object distance D is not stabilized, for example, the object and/or the imaging device 301 are still moving relative to each other, the processor 205 may not trigger a new autofocus operation of the imaging device 200. In some embodiments, the designated period of time may be a predetermined amount of time period stored in memory. Alternatively, the designated time period may be dynamically determined by the imaging device 200. Similarly, the designated number of captured image frames may be a predetermined number stored in memory. Alternatively, the designated number of captured image frames may be dynamically determined by the imaging device 200.

In some embodiments, the dynamic determination of designated time or number of captured images can be made based on a determination of the type of object 302, the type of a previously determined movement of the object 302 or a scene in which the object 302 is being imaged. For example, if the object 302 is determined to be a human object posing for a portrait, the designated time can be a shorter time compared to a scenario in which the object 302 is determined to be a moving pet. Other criteria may also be used to dynamically determine the designated time or designated number of captured images.

Figure 4:
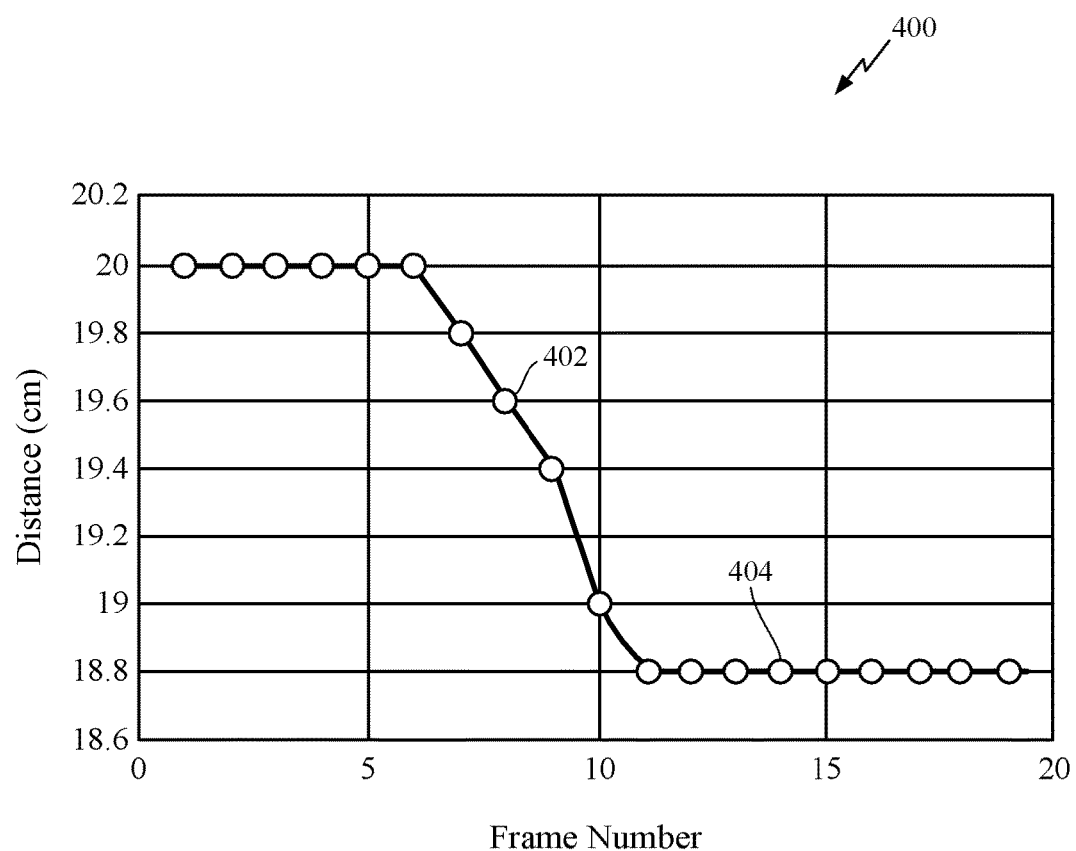
FIG. 4 is a graph illustrating the distance of an object from an imaging device (y-axis) versus the number of captured image frames (x-axis) according to an embodiment.

FIG. 4 is a graph 400 illustrating an example of distance of an object from an imaging device versus the number of captured image frames over time. Referring to FIGS. 4 and 3, an autofocus trigger process according to an embodiment will be described. In the graph 400, on the y axis, the distance of an object 302 from the imaging device 301 is shown in units of centimeter (cm). In the graph 400, on the x axis, the number of consecutive captured image frames, or "Frame Number" is depicted. For example, from the first frame to the sixth frame, the object distance D from the imaging device 301 is approximately 20 cm. A region of focus D1-D2 corresponding to the current lens parameters can be determined. The object 302 is tracked as its position relative to the imaging device 301 changes. The change in position (or object distance) can be due to the imaging device 301 and/or the object 302 changing position relative to each other. In the example shown in FIG. 4, starting from the frame number 6, the distance between the imaging device 201 and the object 202 is decreasing. For example, the object 202 is moving closer to the imaging device 201. Or alternatively, the imaging device 301 is moved closer to the object 302, or both the imaging device 201 and object 202 may be moving. Near point 402, it is determined that the object distance D is now outside the region of focus D1-D2. However, a new autofocus operation is not triggered as the object distance D continues to change. The object distance D is further monitored until it is determined that the object distance D is no longer changing. In the example of FIG. 4, the object distance D is determined to have stabilized at approximately frame number 14 or point 404. A new autofocus operation can therefore be triggered at or near the point 404.

Figure 5:
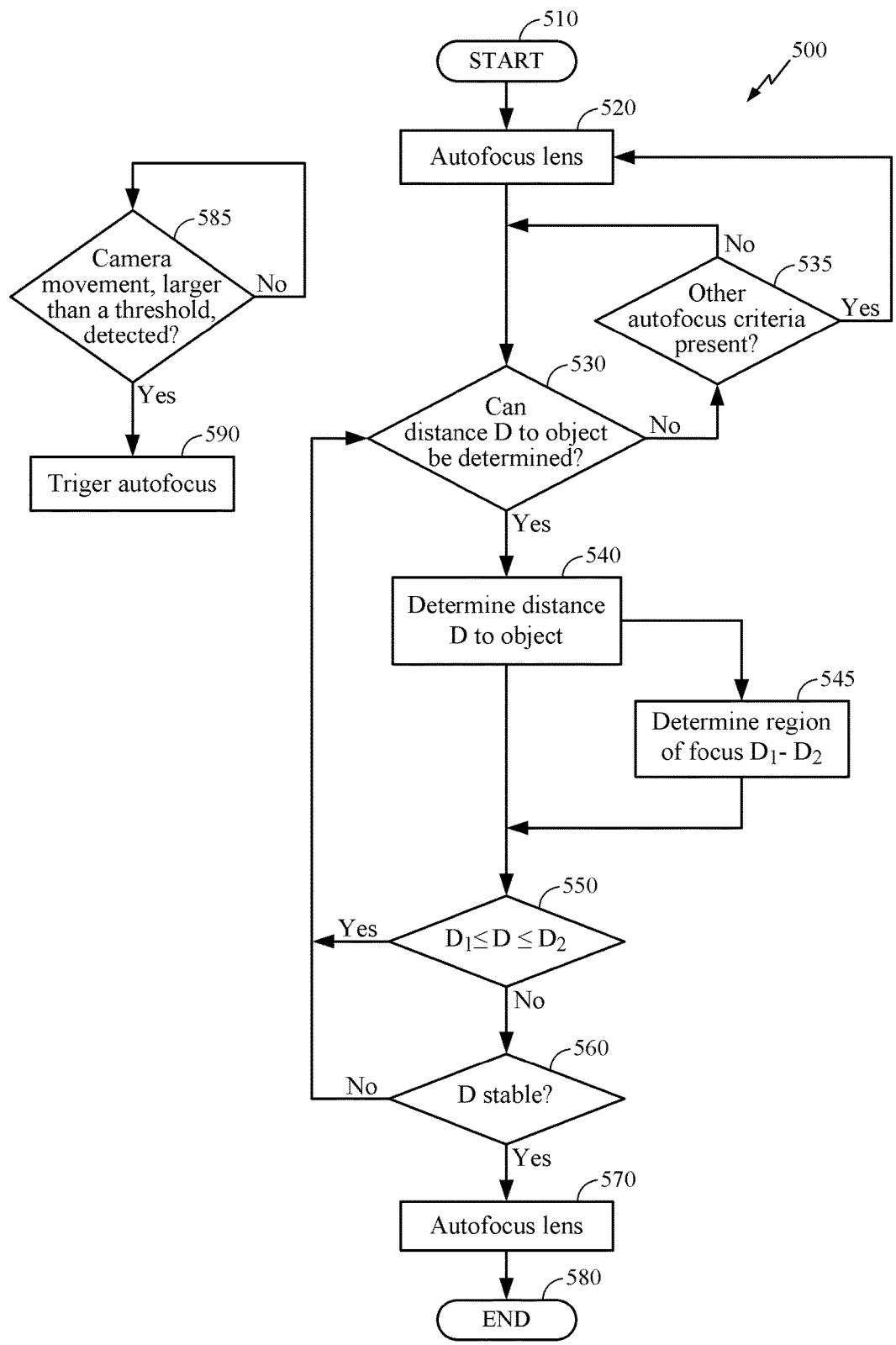
FIG. 5 is a flowchart diagram illustrating an example of an embodiment of an autofocus trigger process according to an embodiment.

FIG. 5 is a flowchart diagram of an autofocus trigger process 500 according to some embodiments which can be used with the imaging device 200 of FIG. 2. The process of monitoring for an autofocus trigger event can start at any time, or be ongoing in the background of other operations of the imaging device 200 of FIG. 2. For example in the flowchart of FIG. 5, an autofocus trigger process is depicted between two autofocus trigger events 520 and 570. Referring to FIGS. 2 and 5, the process 500 can start at the block 510. Next, in the block 520, an initial autofocus operation can be triggered and one or more lenses 210 and 216 of the imaging device 200 are autofocused. One of ordinary skill in the art can readily realize that the autofocus trigger process as will be described below does not have to begin with triggering an initial autofocus operation and the block 520 can initially be skipped. For example, if one or more of the lenses 210 and 216 have previously been focused, the process 500 can start from the block 530. Referring to FIGS. 2, 3 and 5, in the block 530, it is ascertained whether or not an object distance D can be determined. If the object distance D cannot be determined the process 500 can move to the block 535 where it is determined whether other criteria for triggering autofocus operation may be present. Other criteria can, for example, include whether a change in exposure between a captured image frame and one or more subsequent captured image frames may exist, or whether a loss of contrast differentiation between a captured image frame and one or more subsequent captured image frames may exist. If other criteria for triggering autofocus exist, the process 500 may return to the block 520 and a new autofocus operation may be triggered and one or more of the lens 210 and the second lens 216 (if used) can be autofocused.

If in the block 530, the imaging device 201 can determine the object distance D, the process 500 can move to the block 540, where an object distance D from the imaging device 201 to the object 202 can be determined. Several criteria and implementation details can relate to whether or not the object distance D can be determined. For example, if stereo disparity, as described above, is used, whether the disparity of a feature in an object can be determined can also determine whether the object distance D can be determined. In other examples, when laser range finding, as described above, is used, whether the time taken for a light pulse to travel from the imaging device 301 to the object 302 and back can be determined can also determine whether the object distance D can be determined. In other embodiments, whether the object distance D can be determined relate to whether the object tracking module 240 has been able to track the object 302. Other parameters might also relate to whether an object distance D can be determined depending on systems and/or methods used to implement the imaging device 301, distance determination and monitoring module 224 and object tracking module 240.

Next, the process 500 moves to the block 545 where the imaging device 200 can determine a region of focus based on the lens characteristics and parameters of the lens 210 and/or the second lens 216 (if used). As described above, in relation to the description of FIG. 2, the lens characteristics can include lens hardware data, the lens parameters can include, for example, the focusing distance, lens focal length and lens aperture. Next, the process 500 can move to the block 550, where it can be determined whether the object distance D falls within the region of focus D1-D2. If yes, the process 500 can return to the block 530 and can continue to determine and monitor the object distance D and monitor whether the object distance D is within the region of focus D1-D2. When the process 500 is returned from the block 550 to the block 530, for example, when the object distance is within the region of focus D1-D2, the block 545 may optionally be skipped since the lens parameters have remained the same and a re-determination of a region of focus D1-D2 would yield the same region of focus D1-D2 which may have previously been determined. The process 500 can therefore conserve resources of the imaging device 200 by avoiding unnecessary recalculation of the region of focus D1-D2.

If in the block 550, it can be determined that the object distance D has fallen outside the region of focus D1-D2, the process 500 can continue to the block 560, where it can be determined whether the object distance D relative to the imaging device 200 is stable. As described above, object stability can be defined in variety of ways depending on the implementation of the imaging device 200. For example, if the object distance D remains unchanged within more than a designated number of captured image frames, the distance D can be deemed stable and the process 500 can move to the block 570 where a new autofocus operation can be triggered and the lens 210 and/or the second lens 216 (if used) may be autofocused. If, on the other hand, the object distance D is not stable, for example, the distance D changes between one or more consecutive captured image frames, the process 500 can return to the block 530 and continue to determine and monitor the object distance D in relation to the region of focus D1-D2. Alternatively, in some embodiments, the block 560 of determining object distance stability may be skipped and a new autofocus operation can be triggered if in the block 550, it can be determined that the object distance D has fallen outside the region of focus D1-D2. The process 500 ends at the block 580, for example, when the image capture functionality of the imaging devices 200 is disabled or turned off.

In some embodiments, the designated number of captured image frames may be a predetermined number stored in memory. Alternatively, the designated number of captured image frames may be dynamically determined by the imaging device 200.

In some embodiments, in addition to executing the blocks outlined above, the process 500 can also execute in parallel an autofocus trigger process according to the blocks 585 and 590. Some imaging devices can include a motion detector, for example an accelerometer or gyroscope in a mobile computing device. Often a significant movement of the imaging device 200 can indicate a change in scene such that a new autofocus operation should be triggered. Consequently, the process 500 can also accept a signal from a motion detector and if a significant imaging device movement, for example a movement in excess of a predetermined threshold can be detected, the process 500 can trigger an autofocus operation in the block 590. If a signal indicating a significant motion of the imaging device 200 cannot be detected, the process 500 can return to the block 585 and continue to monitor the signal from a motion detector of the imaging device 200.

As described, some embodiments take advantage of a direct metric, for example a region of focus, to determine when to trigger an autofocus operation of an imaging device. Consequently, the described embodiments have improved autofocus triggering functionality.

Figure 6:
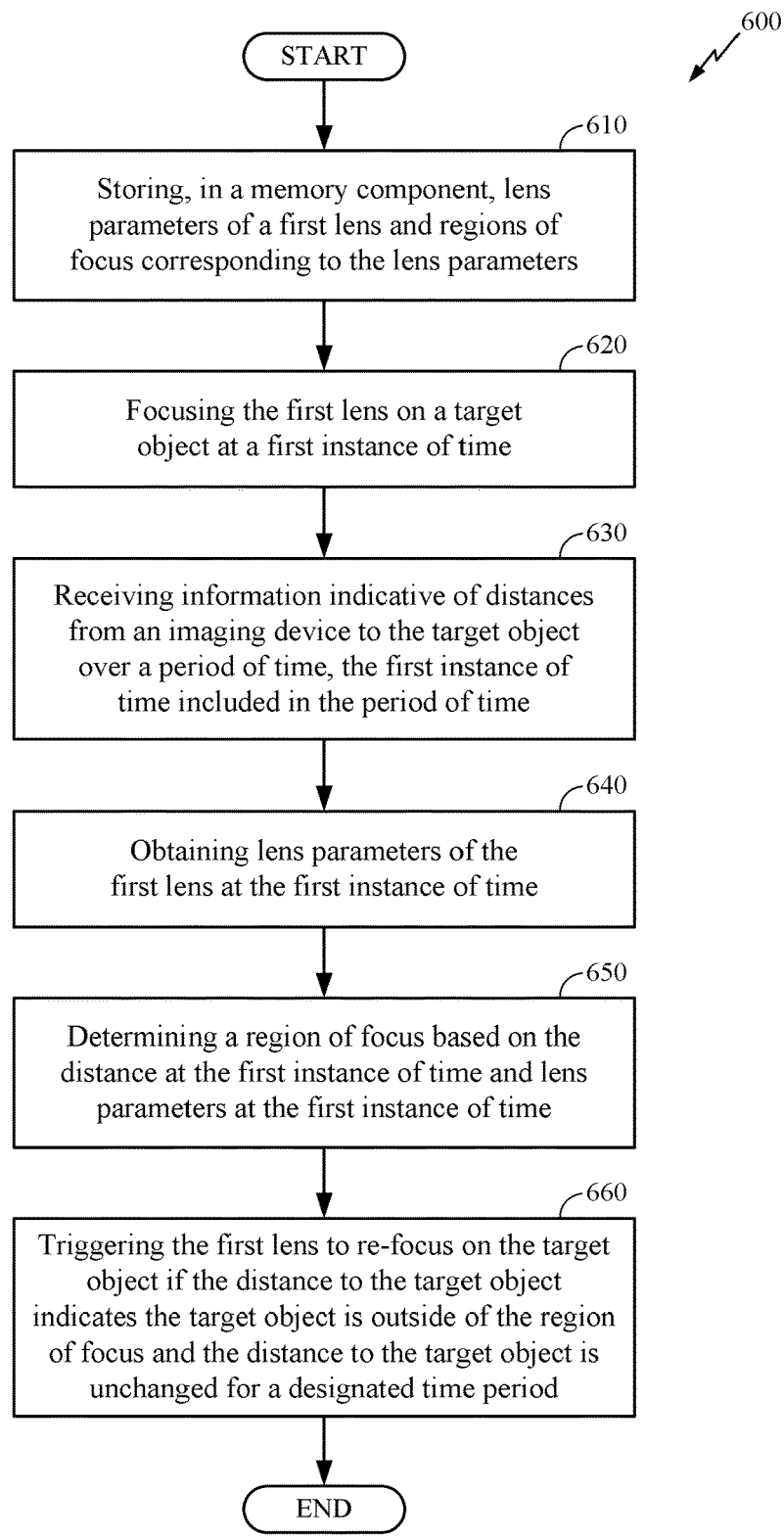
FIG. 6 is flowchart illustrating a method of triggering autofocus operation according to an embodiment.

FIG. 6 is flowchart illustrating a method 600 of triggering autofocus operation according to an embodiment. The method starts at block 610 by storing, in a memory component, lens parameters of a first lens and regions of focus corresponding to the lens parameters. Next, the method moves to the block 620 by focusing the first lens on a target object at a first instance of time. Next, the method moves to the block 630 by receiving information indicative of distances from an imaging device to the target object over a period of time, the first instance of time included in the period of time. Then the method moves to the block 640 by obtaining lens parameters of the first lens at the first instance of time. The method then moves to the block 650 by determining a region of focus based on the distance at the first instance of time and lens parameters at the first instance of time. Next, the method ends at the block 660 by triggering the first lens to re-focus on the target object if the distance to the target object indicates the target object is outside of the region of focus and the distance to the target object is unchanged for a designated time period.

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed embodiments or aspects of the embodiments. A person of ordinary skill in the art will appreciate that a portion, or a part, may comprise something less than, or equal to, a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the embodiments of the innovations disclosed herein. Various modifications to these implementations will be readily apparent to those skilled in the art, and the generic principles defined herein may be applied to other implementations without departing from the spirit or scope of the disclosure. Thus, the presently described embodiments are not intended to be limited to the implementations shown herein but are to be accorded the widest scope consistent with the principles and novel features disclosed herein.

What is claimed is:

1. An imaging device, comprising:
    a main camera comprising a first image sensor and a first lens, the first image sensor configured to generate a first image of a target object at a first focal length of the first lens;
    an auxiliary camera comprising a second image sensor configured to generate a second image of the target object;
    a memory component configured to store lens parameters for the main camera and depths of field corresponding to the lens parameters; and
    a processor configured to communicate with the memory component, the processor configured to:
        determine a distance from the imaging device to the target object based on a disparity between a first position of the target object in the first image and a second position of the target object in the second image;
        retrieve, from the memory component, a lens parameter of the lens parameters for the main camera, the lens parameter corresponding to capture of the first image;
        determine, based on the retrieved lens parameter, a depth of field at which a sharp image of the target object can be formed on the main camera;
        trigger the first lens to focus on the target object based on the depth of field;
        determine whether the distance from the imaging device to the target object is unchanged over a time period; and
        in response to determining the distance from the imaging device to the target object is unchanged over the time period, capture an image of the target object with the main camera with the first lens focused according to the depth of field.

2. The imaging device of claim 1, wherein the processor is configured to determine, based on the retrieved lens parameter, a near distance and a far distance bounding the depth of field and including the distance from the imaging device to the target object, wherein the target object appears sharp in the image, and wherein objects located beyond the far distance appear un-sharp in the image.

3. The imaging device of claim 1, wherein the auxiliary camera comprises a second lens.

4. The imaging device of claim 3, wherein the memory component is configured to store a stereo baseline value representing a separation distance between the first lens and the second lens, and wherein the processor is configured to:
    access the stereo baseline value from the memory;
    determine the distance from the imaging device to the target object based on the stereo baseline value, the first focal length of the first lens, and the disparity.

5. The imaging device of claim 4, the second lens having a second focal length, wherein, to determine the distance from the imaging device to the target object, the processor is configured:
    multiply the stereo baseline value by a focal length generated based on the first and second focal lengths; and
    divide a result of the multiplying by the disparity.

6. The imaging device of claim 1, wherein the processor is configured to:
    identify a central point on the object;
    determine the first position of the target object in the first image and the second position of the target object in the second image based, respectively, on first and second positionings of the central point; and
    calculate the disparity based on a horizontal distance between the first and second positionings of the central point.

7. The imaging device of claim 1, wherein the processor is configured to determine the disparity based on a position of the first lens during capture of the first image.

8. The imaging device of claim 1, wherein the processor is configured to receive additional information indicative of distances from the imaging device to the target object over the time period.

9. A method of focusing an imaging device having a main camera including a first image sensor and a first lens, and an auxiliary camera including a second image sensor, the method comprising:
    capturing with the first image sensor a first image of a target object at a first focal length of the first lens;
    capturing with the second image sensor a second image of the target object;
    determining a distance from the imaging device to the target object based on a disparity between a first position of the target object in the first image and a second position of the target object in the second image;
    retrieving, from a memory component, a lens parameter for the main camera, the lens parameter corresponding to capture of the first image;
    determining, based on the retrieved lens parameter, a depth of field at which a sharp image of the target object can be formed on the main camera;
    triggering the first lens to focus on the target object based on the depth of field; and
    determining whether the distance from the imaging device to the target object is unchanged over a time period; and
    in response to determining that the distance from the imaging device to the target object is unchanged over the time period, capturing an image of the target object with the main camera with the first lens focused according to the depth of field.

10. The method of claim 9, further comprising determining, based on the retrieved lens parameter, a near distance and a far distance bounding the depth of field and including the distance from the imaging device to the target object, wherein the target object appears sharp in the image, and wherein objects located beyond the far distance appear un-sharp in the image.

11. The method of claim 9, wherein the auxiliary camera comprises a second lens, the method further comprising:
retrieving a stereo baseline value representing a separation distance between the first lens and the second lens from the memory component; and
determining the distance from the imaging device to the target object based on the stereo baseline value, the first focal length of the first lens, and the disparity.

12. The method of claim 11, wherein the second lens has a second focal length, the method further comprising determining the distance from the imaging device to the target object by:
multiplying the stereo baseline value by a focal length generated based on the first and second focal lengths; and
dividing a result of the multiplying by the disparity.

13. The method of claim 9, further comprising:
identifying a central point on the object;
determining the first position of the target object in the first image and the second position of the target object in the second image based, respectively, on first and second positionings of the central point; and
calculating the disparity based on a horizontal distance between the first and second positionings of the central point.

14. The method of claim 9, further comprising determining the disparity based on a position of the first lens during capture of the first image.

15. The method of claim 9, further comprising receiving additional information indicative of distances from the imaging device to the target object over the time period.

16. A non-transitory computer-readable medium storing instructions that, when executed by one or more computing devices, configure the one or more computing devices to perform a method comprising:
capturing with the first image sensor a first image of a target object at a first focal length of the first lens;
capturing with the second image sensor a second image of the target object;
determining a distance from the imaging device to the target object based on a disparity between a first position of the target object in the first image and a second position of the target object in the second image;
retrieving, from a memory component, a lens parameter for the main camera, the lens parameter corresponding to capture of the first image;
determining, based on the retrieved lens parameter, a depth of field at which a sharp image of the target object can be formed on the main camera;
triggering the first lens to focus on the target object based on the depth of field; and
determining whether the distance from the imaging device to the target object is unchanged over a time period; and
in response to determining that the distance from the imaging device to the target object is unchanged over the time period, capturing an image of the target object with the main camera with the first lens focused according to the depth of field.

17. The non-transitory computer-readable medium of claim 16, wherein the method further comprises determining, based on the retrieved lens parameter, a near distance and a far distance bounding the depth of field and including the distance from the imaging device to the target object, wherein the target object appears sharp in the image, and wherein objects located beyond the far distance appear un-sharp in the image.

18. The non-transitory computer-readable medium of claim 16, wherein the auxiliary camera comprises a second lens, wherein the method further comprises:
retrieving a stereo baseline value representing a separation distance between the first lens and the second lens from the memory component; and
determining the distance from the imaging device to the target object based on the stereo baseline value, the first focal length of the first lens, and the disparity.

19. The non-transitory computer-readable medium of claim 18, wherein the second lens has a second focal length, wherein the method further comprises determining the distance from the imaging device to the target object by:
multiplying the stereo baseline value by a focal length generated based on the first and second focal lengths; and
dividing a result of the multiplying by the disparity.

20. The non-transitory computer-readable medium of claim 16, wherein the method further comprises:
identifying a central point on the object;
determining the first position of the target object in the first image and the second position of the target object in the second image based, respectively, on first and second positionings of the central point; and
calculating the disparity based on a horizontal distance between the first and second positionings of the central point.

21. The non-transitory computer-readable medium of claim 16, wherein the method further comprises determining the disparity based on a position of the first lens during capture of the first image.

22. The non-transitory computer-readable medium of claim 16, wherein the method further comprises receiving additional information indicative of distances from the imaging device to the target object over the time period.

* * * * *